(12) United States Patent
Goren et al.

(10) Patent No.: US 8,061,616 B2
(45) Date of Patent: Nov. 22, 2011

(54) AIMING SIGHT FOR A BARCODE READER

(75) Inventors: David P. Goren, Smithtown, NY (US); Edward Barkan, Miller Place, NY (US); Christopher W. Brock, Manorville, NY (US); Chinh Tan, Setauket, NY (US); Carl D. Wittenberg, Water Mill, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/641,382

(22) Filed: Dec. 18, 2009

(65) Prior Publication Data

US 2011/0147459 A1 Jun. 23, 2011

(51) Int. Cl.
G06K 7/10 (2006.01)
G06K 9/24 (2006.01)
G06K 5/04 (2006.01)
G06K 9/32 (2006.01)

(52) U.S. Cl. ......... 235/462.21; 235/462.43; 235/462.44; 235/462.08; 235/462.2; 235/462.01

(58) Field of Classification Search ............. 235/462.21, 235/462.43, 462.44, 462.08, 462.2, 462.01
See application file for complete search history.

(56) References Cited

U.S. PATENT DOCUMENTS

| | | | | |
|---|---|---|---|---|
| 5,587,577 A * | 12/1996 | Schultz | ..................... | 235/462.44 |
| 5,598,007 A * | 1/1997 | Bunce et al. | ................. | 250/566 |
| 5,734,153 A * | 3/1998 | Swartz et al. | ............ | 235/462.21 |
| 5,949,057 A * | 9/1999 | Feng | ......................... | 235/472.01 |
| 6,749,120 B2 * | 6/2004 | Hung et al. | .............. | 235/472.01 |
| 6,959,867 B2 * | 11/2005 | Knappert et al. | ............. | 235/454 |
| 6,997,387 B1 * | 2/2006 | Hepworth et al. | ........ | 235/462.08 |
| 7,021,542 B2 * | 4/2006 | Patel et al. | ..................... | 235/454 |
| 7,182,260 B2 * | 2/2007 | Gurevich et al. | ......... | 235/462.08 |
| 7,201,321 B2 * | 4/2007 | He et al. | ..................... | 235/462.2 |
| 2002/0011520 A1 * | 1/2002 | Gurevich et al. | ......... | 235/462.21 |
| 2002/0070278 A1 * | 6/2002 | Hung et al. | .............. | 235/472.01 |
| 2002/0139030 A1 * | 10/2002 | Smith | ............. | 42/122 |
| 2002/0170965 A1 * | 11/2002 | Crowther et al. | ............. | 235/454 |
| 2004/0069855 A1 * | 4/2004 | Patel et al. | ................ | 235/472.01 |
| 2004/0218118 A1 * | 11/2004 | Hayashi | ........................... | 349/96 |
| 2005/0210727 A1 * | 9/2005 | Smith, III | ........................ | 42/122 |
| 2005/0284942 A1 * | 12/2005 | Gurevich et al. | ......... | 235/462.21 |
| 2006/0038017 A1 * | 2/2006 | Carlson et al. | ........... | 235/462.24 |
| 2006/0118635 A1 * | 6/2006 | Joseph et al. | ............. | 235/462.24 |
| 2007/0199996 A1 * | 8/2007 | He et al. | ..................... | 235/462.43 |
| 2009/0064561 A1 * | 3/2009 | Piltonen | .......................... | 42/119 |

FOREIGN PATENT DOCUMENTS

WO 2005006148 1/2005

OTHER PUBLICATIONS

International Search Report and Written Opinion dated Feb. 18, 2011 in related case PCT/US2010/057318.

* cited by examiner

*Primary Examiner* — Daniel Walsh

(57) ABSTRACT

An apparatus, system, and method for aiming and reading a target object. The apparatus includes a barcode reader for reading the target object. The apparatus also includes an aiming sight coupled to the barcode reader. The aiming sight is used for aiming the target object and thereby directing the barcode reader to read the target object. The aiming sight can either be used independently or can be used along with an aiming pattern generator present in the barcode reader, in order to read the target object.

17 Claims, 5 Drawing Sheets

AIMING SIGHT FOR A BARCODE READER

FIELD OF THE DISCLOSURE

The present disclosure relates generally to barcode readers and more particularly to adding an aiming sight to a barcode reader.

BACKGROUND

Various electro-optical systems have been developed for reading optical indicia, such as barcodes. A barcode is a coded pattern of graphical indicia comprised of a matrix or series of bars and spaces of varying widths, the bars and spaces having differing light reflecting characteristics.

Systems that read barcodes called barcode readers electro-optically transform the graphic indicia into electrical signals and then decode the electric signals into alphanumerical characters that are intended to be descriptive of the article or some characteristic thereof. There are different types of barcode readers or scanners each including different set of components and employing different methods, to read a barcode. The types include such as, but not limited to, pen type readers, laser scanners, CCD readers, and 2D imaging scanners.

Pen type readers consist of a light source and a photodiode that are placed next to each other in the tip of a pen or wand. In order to read a barcode present on a label on a target object, the tip of the pen is moved or swiped across the label in a steady motion. The photodiode measures the intensity of the light reflected back from the light source and generates a waveform that is used to measure the widths of the bars and spaces in the barcode.

Laser scanners work the same way as pen type readers except that they use a laser beam as the light source and typically employ either a reciprocating mirror or a rotating prism to scan the laser beam back and forth across the target object.

CCD readers (also referred to as LED scanner) use an array of hundreds of tiny light sensors lined up in a row in the head of the reader. Each sensor measures the intensity of the light immediately in front of it. The important difference between a CCD reader and a pen or laser scanner is that the CCD reader is measuring emitted ambient light from the barcode whereas pen or laser scanners are measuring reflected light of a specific frequency originating from the scanner itself.

2D imaging scanners use a small video camera to capture an image of the barcode. The reader then uses sophisticated digital image processing techniques to decode the barcode.

In all the above cases, the ability of a scanner to successfully read and decode a target object is directly dependent upon the ability to move the scanner to a suitable position whereby a satisfactorily clear image of the target object is obtained. In order to obtain a clear image of the target object, the scanner has to be properly directed or aimed towards the target object. In general all the present day scanners have an aiming pattern generator for generating a visible aiming pattern. The visible aiming pattern can include such as, but not limited to, a laser dot or a laser line that enables an operator to aim the scanner at the target object and thereby read the target object.

However, at long distances or in high ambient light the aiming pattern generator might fail to accurately aim the particular target object. In cases of high ambient light such as sunlight, the laser aiming dot is not visible. On the other hand, in low light conditions such as scanning in a warehouse, the laser aiming dot may not be easily visible at large distances. Also, aiming at large distances could also be difficult in cases where there is no reflective background to see the current position of the laser dot to help guide the operator towards the barcode. In such conditions, one way of improving the visibility of the laser aiming dot can be achieved by increasing the laser power. However, this method is limited due to laser safety regulations. Another way to improve visibility is by making the operator wear colored glasses such as red glasses for a red laser to filter out ambient light, but this has the inconvenience of having to manage a supply of glasses.

Accordingly, there is a need for an alternate method to aim the barcode scanner at the desired target object.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
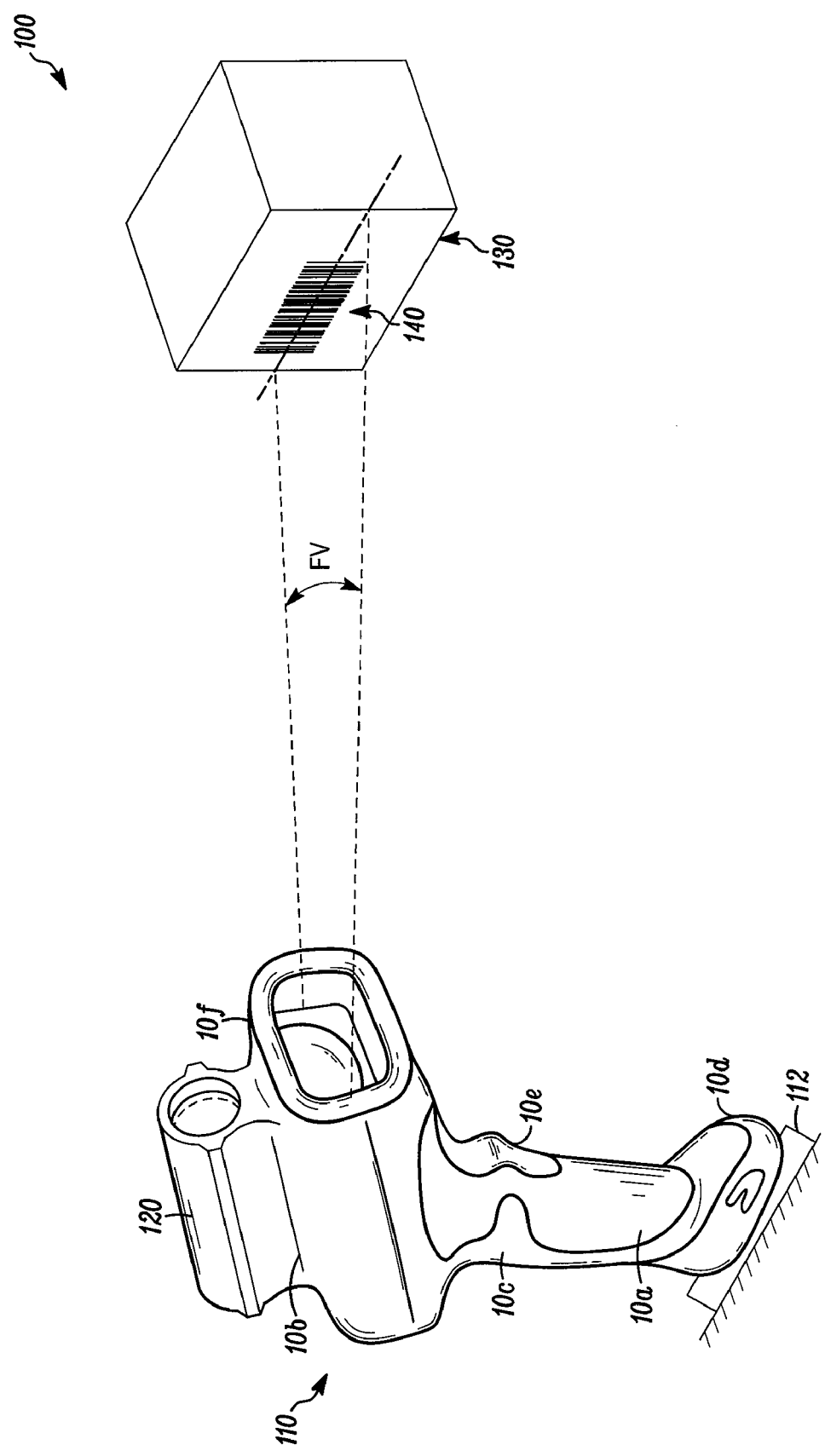
FIG. 1 is a system diagram of barcode system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention relates to an apparatus, system, and method for aiming and reading a target object. The apparatus mainly includes a barcode reader for reading the target object. The apparatus also includes an aiming sight coupled to the barcode reader. The aiming sight is used for aiming the target object and thereby directing the barcode reader to read the target object. The aiming sight can either be used independently or can be used along with an aiming pattern generator present in the barcode reader, to read the target object. Advantages of various embodiments include: accurately aiming a target object and reading a barcode on the target object under challenging conditions such as, high ambient light conditions, low or poor lighting condition, when the target object is present at long distances, scanning a group of closely placed barcodes, etc,. Those skilled in the art will realize that the above recognized advantages and other advantages described herein are merely illustrative and are not meant to be a complete rendering of all of the advantages of the various embodiments.

Referring now to figures, FIG. 1 is a system diagram of a barcode system 100 in accordance with some embodiments. The barcode system 100 can include such as, but not limited to an imaging based barcode system or a laser based barcode system. The barcode system 100 shows a hand-held barcode reader or scanner 110 acting upon a target object 130 having a barcode 140. The barcode reader or scanner 110 can be an imaging based barcode scanner or a laser based barcode reader. The barcode 140 can include such as but not limited to the popular barcode symbologies such as: Uniform Product Code (UPC), typically used in retail stores sales; Code 39, primarily used in inventory tracking; Postnet, which is used for encoding zip codes for U.S. mail; and PDF 417 barcodes, which is used in driving licenses. Barcodes may be one dimensional (1D), i.e., a single row of graphical indicia such as the UPC barcode or two dimensional (2D), i.e., multiple rows of graphical indicia comprising a single barcode such as the PDF 417 barcode.

Figure 2:
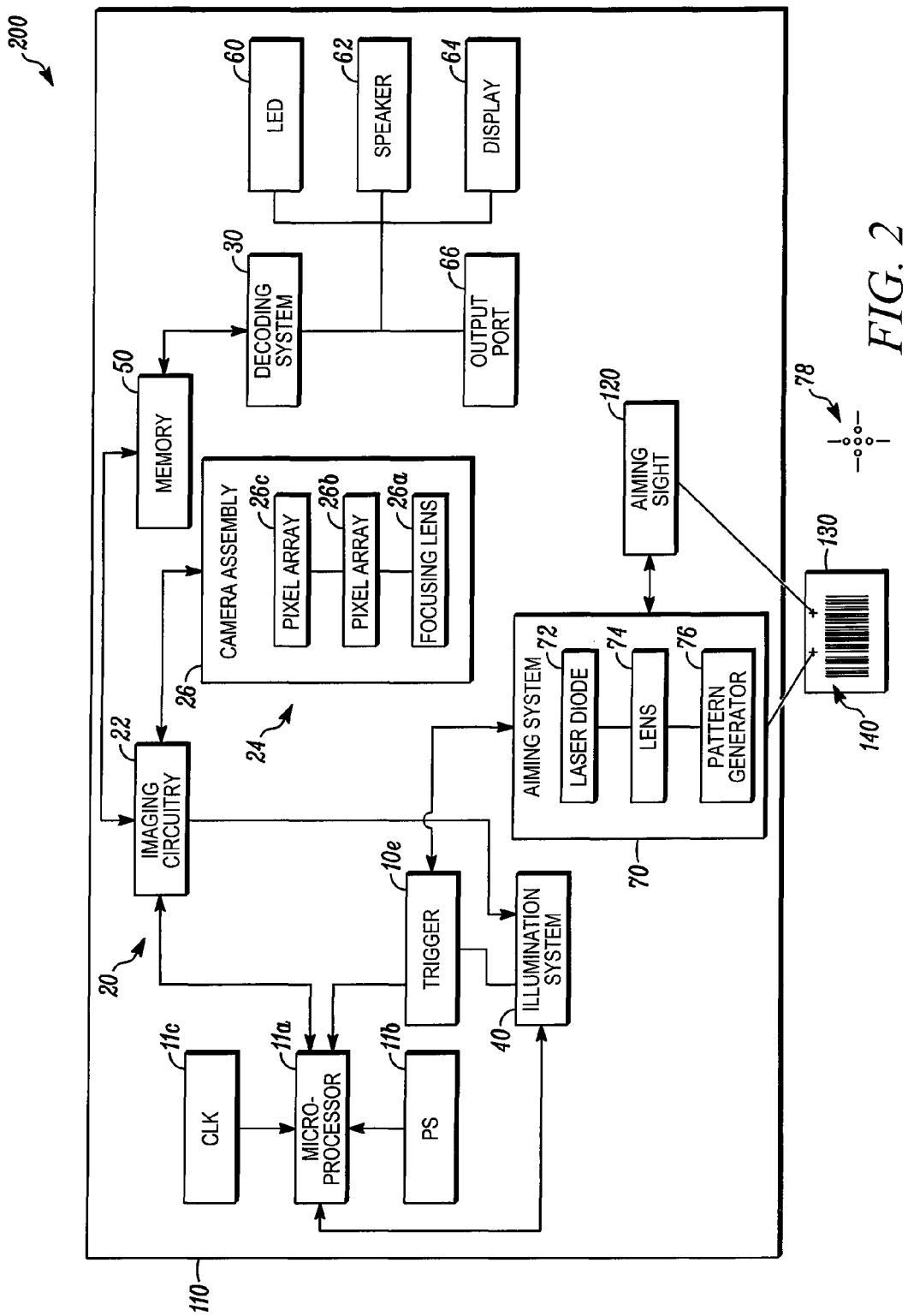
FIG. 2 is a block diagram of a barcode reader in accordance with some embodiments.

Returning back to the description of FIG. 1, the hand-held barcode reader 110 includes a gripping portion 10a adapted to be grasped by an operator's hand and a forward or scanning head portion 10b extending from an upper part 10c of the gripping portion 10a. A lower part 10d of the gripping portion 10a is adapted to be received in a docking station 112 positioned on a substrate such as a table or sales counter. The barcode reader 110 includes a front wall region 10f on the scanning head portion 10b. The scanning head portion 10b also includes an imaging camera assembly 24 and an illumination system 40, as shown in FIG. 2. The imaging camera assembly 24 includes a housing supporting focusing optics including one or more imaging lens and a photo sensor or pixel array for capturing the image of the barcode 140 through a transparent window (not shown) present on the front wall 10f.

The scanning head portion 10b also includes an attachment means (not shown), such as, but not limited to a clamp or a socket to attach an aiming sight 120 to the barcode reader 110. The aiming sight 120 is similar to the aiming sights used in firearms and telescopes and their working is already known in the art. The different types of aiming sight 120 such as, but not limited to open sight aiming sight, tube sight aiming sight, telescopic sight aiming sight, aperture sight aiming sight, and reflex sight aiming sight can be used and are described below with reference to FIG. 3. The aiming sight 120 can be coupled to the barcode reader 110 using different methods. In one embodiment, the aiming sight 120, such as the open sight aiming sight, can be permanently glued to or molded on the barcode reader 110. In a second embodiment, the aiming sight 120, such as the tube sight aiming sight, can be built into the housing of the barcode reader 110. In a third embodiment, the aiming sight 120 can be removably attached to the barcode reader 110. The removable sight can be part of a removal boot such as a rubber boot. In a fourth embodiment, the aiming sight 120 can be a foldable sight such as the front bead of an open sight that folds flat when not in use.

Returning back to FIG. 1, the barcode reader 110 in accordance with some embodiments of the present invention is adapted to be used in both a hand-held mode and a fixed position mode. In the fixed position mode, the reader 110 is received in the docking station 112 and a target object 130 having a target barcode 140 is brought within the field of view (FV) of imaging camera assembly 24 in order to have the barcode reader 110 read the target barcode 140. The imaging camera assembly 24 is typically always on or operational in the fixed position mode to image and decode any target barcode 140 presented to the barcode reader 110 within the field of view (FV). The docking station 112 is plugged into an AC power source and provides regulated DC power to the barcode reader 110. Thus, when the barcode reader 110 is in the docking station 112 power is available to keep the imaging camera assembly 24 on continuously. In the hand-held mode, the reader 110 is removed from the docking station 112 so the reader 110 can be carried by an operator and positioned such that the target barcode 140 is within the field of view (FV) of the imaging camera assembly 24. In the hand-held mode, imaging and decoding of the target barcode 140 is instituted by the operator depressing the trigger 10e.

For the purpose of this description, a hand-held imaging based barcode system will be discussed. However, it will be apparent to one of ordinary skill in the art that the techniques and devices described herein can be practiced advantageously with stationary or bi-optic imaging systems.

Figure 1A:
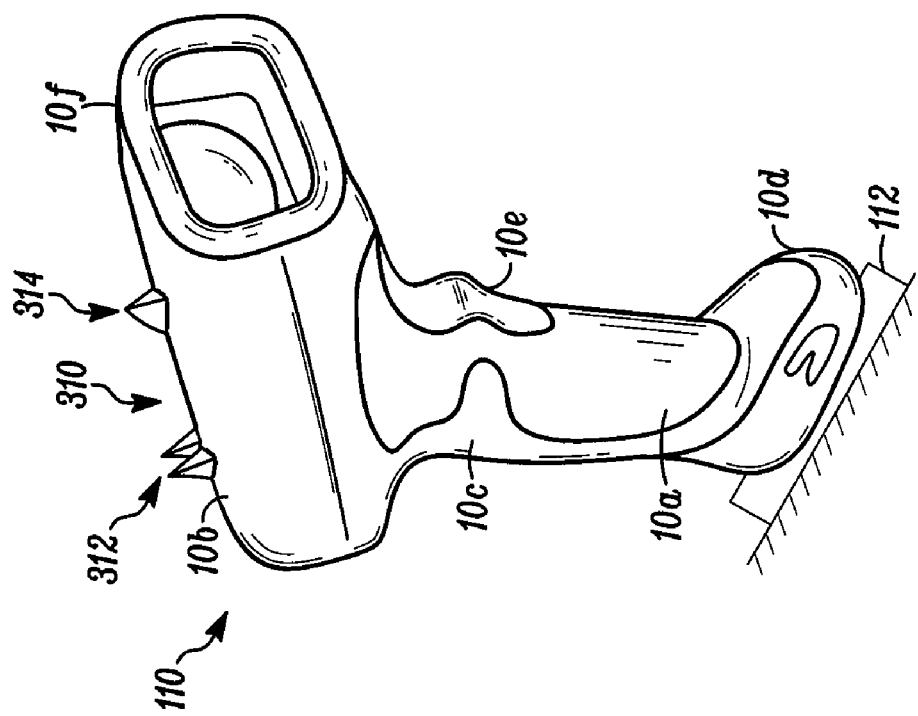
FIG. 1A is a schematic diagram of a barcode reader in accordance with some embodiments.

FIG. 1A is a schematic diagram of a barcode reader in accordance with some embodiments. FIG. 1A illustrates a barcode reader 110 with an aiming sight such as the open sight aiming sight 310. The open sight 310 aiming sight is molded on the barcode reader. The open sight 310 aiming sight includes a rear mounted notch 312 and a front mounted bead 314. The notch 312 can be a V shaped notch or a U shaped notch. The notch 312 and the bead 314 are aligned such that an operator of the barcode scanner 110 can view the target object 130 through the notch and bead arrangement. The notch 312 and the bead 314 are vertically aligned by lining up the top of the front bead with the top of the rear notch, or by placing the bead 314 just above the bottom of the V or U shape of the notch 312. The positioning of the notch 312 and the bead 314 aids the operator in aiming the target object 130 and thereby enable the barcode reader 110 to read the target barcode 140. The present invention is not limited to the usage of the open sight 310 with a rear notch and front bead. Various types of open sights such as, but not limited to buckhorn aiming sight, semi-buckhorn aiming sight, and express aiming sight can also be used and their working is already known in the art.

FIG. 2 is a block diagram of an imaging based barcode reader 110 in accordance with some embodiments. The block diagram 200 illustrates an internal circuitry of the barcode reader 110 in accordance with some embodiments. The imaging based barcode reader 110 includes an imaging system 20 and a decoding system 30. The imaging system 20 is adapted to capture image frames of graphical indicia such as a barcode 140 present in a field of view (FV) of the imaging system 20 and the decoding system 30 is adapted to decode encoded indicia within a captured image frame. The imaging system 20 and the decoding system 30 are part of the barcode system circuitry. The circuitry also includes a microprocessor 11a, a power supply 11b, and an internal oscillator or clock 11c. The microprocessor 11a is used to control the operations of the imaging and decoding systems 20 and 30, respectively. The power supply 11b is used for supplying power to the microprocessor 11a and also to other hardware units within the barcode reader 110. The clock 11c is used for supplying timing information for the operation of the microprocessor 11a.

Returning back to the description of FIG. 2, the imaging system 20 includes the imaging camera assembly 24 and an associated imaging circuitry 22. The imaging camera assembly 24 includes a housing 26 supporting focusing optics including one or more imaging or focusing lens 26a, an aperture 26b, and a photo sensor or pixel array 26c. The focusing lens 26a focuses light reflected and scattered from the target barcode 140 through an aperture 26b onto the pixel/photo sensor array 26c. Thus, the imaging lens 26a focuses an image of the target barcode 140 (assuming it is within the FV) onto the array of pixels comprising the pixel array 26c, thereby enabling the pixel array 26c to capture an image of a target object 130 within a FV of the imaging camera assembly 24 during an exposure period. The FV of the imaging camera assembly 24 includes both a horizontal (shown in FIG. 1) and a vertical (not shown) field of view. The FV of the imaging camera assembly 24 is a function of both the configuration of the sensor array 26c and the optical characteristics of the imaging lens 26a and the distance and orientation between the array 26c and the imaging lens 26a.

Further, the imaging system 20 includes, but not limited to, a linear or one dimensional imaging system and the photo sensor array 26c includes, but not limited to, a linear or 1D sensor array. The sensor array 26c includes such as but not limited to a charged coupled device (CCD), a complementary metal oxide semiconductor (CMOS), or other imaging pixel array, operating under the control of the imaging circuitry 22. The number of pixels in the row typically would be 512, 1024, 2048 or 4096 pixels. The typical size of a pixel in the pixel array would be on the order of 7 microns in horizontal width× 120 microns in vertical height. The linear sensor array 26c is primarily adapted to image 1D barcodes, such as, a UPC barcode as shown in FIG. 1 which extends along a horizontal axis and includes one row of indicia, an array of dark bars and white spaces. However, one of skill in the art would recognize that the present invention is also applicable to imaging systems utilizing a 2D photo sensor array to image 2D barcodes, postal codes, signatures, etc.

Referring back to FIG. 2, the barcode reader 110 includes an aiming system 70 to generate a visible aiming pattern 78 to aid the operator in aiming the barcode reader 110 at the target barcode 140. The aiming system 70 generates the visible aiming pattern 78 comprising a single dot of illumination, a plurality of dots and/or lines of illumination or overlapping groups of dots/lines of illumination. The aiming system 70 typically includes a laser diode 72, a focusing lens 74 and a pattern generator 76 for generating the desired aiming pattern 78. The barcode reader 110 also includes an aiming sight 120 to aid the operator in aiming the barcode reader 110 on the target object 130, such the barcode reader 110 can read the barcode 140 present on the target object. The aiming sight 120 enables the barcode reader 110 to read the barcode 140 under difficult or challenging conditions where the aiming pattern 78 is not visible.

In one embodiment the aiming sight 120 is used by the operator to focus on the target barcode 140. Upon focusing, the operator depresses the trigger 10e to read or capture the image of the target barcode 140. The aiming sight 120 can be used in a stand alone mode i.e., the operator can completely switch off the aiming system 70 in the barcode 110. In one example, if the barcode reader 110 has a two position trigger, where the first position activates the aiming system 70 and the second position activates scanning, the operator who is using the aiming sight 120 can pull directly to the second trigger position after focusing the target barcode 140, dispensing with the use of the aiming system 70. This can save time for the operator and reduce cost for the manufacturer, since it can enable a practical long range scanner with no laser aimer. In another example, the aiming sight 120 can be used to designate which barcode from among a group of closely spaced barcodes will be scanned, without using the aiming pattern 78. This can be important on high shelves where barcodes are located close together. Also, the reader 110 can be calibrated to decode the barcode that is visible in the aiming sight 120 or the barcode that is closest to the sighted area.

In another embodiment, the aiming sight 120 can be used along with the aiming system 70 to aid the operator focus on the target barcode 140. In one example, when the target object 130 is far away from the barcode reader 110, the operator faces difficulty in seeing the aiming pattern 78 projected on the target object 130 and therefore the operator is unable to accurately direct the barcode reader 110 to read the target barcode 140. In such situation, the aiming sight 120 is aligned with the aiming system 70 to match the position of the aiming pattern 78. The operator can use the aiming sight 120 to view the projected aiming pattern 78 and thereby enable reading of the desired barcode 140. However, if the aiming sight 120 cannot be aligned with the aiming system 70 at all distances, it is preferred to have the alignment for long distances where the aiming dot is least visible. This alignment can be achieved by various methods. For example, the aiming sight 120 can be aligned at the time of manufacturing by using fine thread screw and spring. If the aiming sight 120 is aligned at a factory, glue will be applied to fix the alignment and therefore improve shock-worthiness. Alignment of the aiming sight 120 to the aiming pattern 78 will be done indoors, with the barcode scanner 110 rested on a stand. The aiming sight 120 can be fixedly aligned with respect to the aiming system 70 or can be field adjustable with respect to the aiming system 70 to compensate for alignment drifts.

In one example, in order to achieve alignment at all distances we can have separate aiming sight features for short and long distance such as two different front beads on an open sight. This eliminates parallax between the aiming sight 120 and the aiming pattern 78. In another example, in order to improve the visibility of the laser dot the aiming sight 120 can be provided with an optical filter such as a red filter to more easily see red laser dot.

Referring back to FIG. 2, the barcode reader 110 further includes an illumination system 40 to illuminate the target barcode 140. The illumination system 40 directs an illumination pattern towards the target barcode 140. The illumination from the illumination system 40 is reflected by the target barcode 140. The reflected light then passes through the imaging lens 26a and is focused onto the sensor array 26c of the imaging system 20. The pixel array 26c generates an analog electrical signal by reading out some or all of the pixels of the pixel array 26c after an exposure period. In some sensors, particularly CMOS sensors, all pixels of the pixel array 26c are not exposed at the same time, thus, reading out of some pixels may coincide in time with an exposure period for some other pixels. The analog signal from the pixel array 26c is amplified by a gain factor of the imaging circuitry 22 and then digitized by the A/D converter of the imaging circuitry 22 to generate a digitized signal. The digitized signal includes a sequence of digital gray scale values typically ranging from 0-255 (for an eight bit processor, i.e., $2^8=256$), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness). The digitized gray scale values are stored in a memory 50. The digitized gray scale values correspond to an image frame which is representative of the image projected by the imaging lens 26a onto the pixel array 26c during an exposure period. The digitized gray scale values can be sent to the decoding system 30 to obtain the data represented by the barcode 140.

The decoding system 30 operates on the digitized gray scale values of the image frame and attempts to decode any decodable image within the image frame. If the decoding is successful, decoded data, representative of the data/information coded in the barcode 140 is then output via a data output port 66 and/or displayed to the user of the barcode reader 110 via a display 64. Upon achieving a good "read" of the barcode 140, that is, the barcode 140 was successfully imaged and decoded, a speaker 62 and/or an indicator LED 60 is activated by the barcode circuitry to indicate to the user that the target barcode 140 has been successfully imaged and decoded. If decoding is unsuccessful, a successive image frame is selected and the decoding process is repeated until a successful decode is achieved.

The imaging and decoding systems 20, 30 of the present invention may be embodied in hardware, software, electrical circuitry, firmware embedded within the microprocessor 11a or the imaging camera assembly 24, on a flash read only memory (ROM), on an application specific integrated circuit (ASIC), or any combination thereof.

Figure 3:
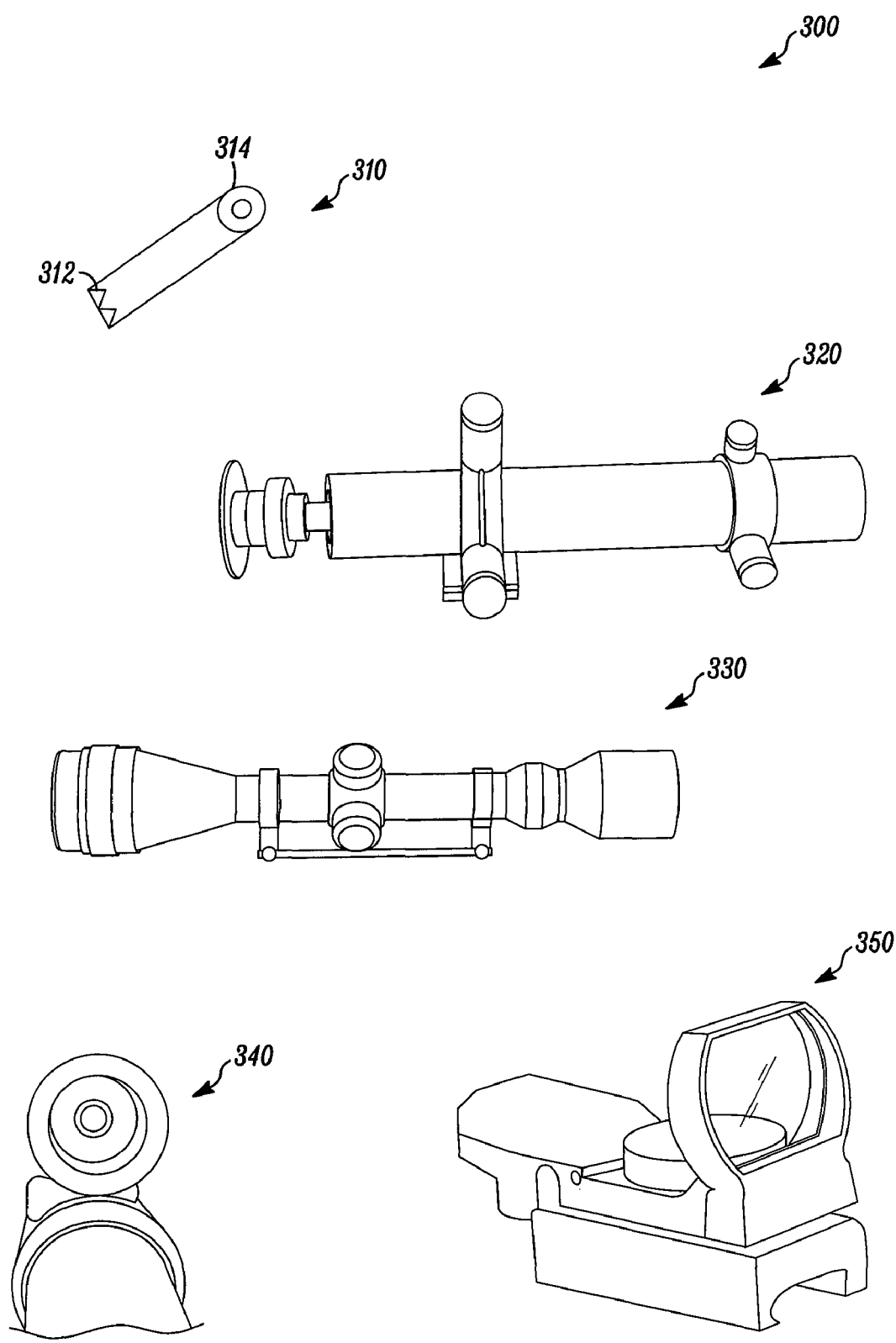
FIG. 3 is a schematic diagram of various aiming sights in accordance with some embodiments.

FIG. 3 is a schematic diagram of various aiming sights in accordance with some embodiments. The different types of aiming sights include an open sight 310 aiming sight, a tube sight 320 aiming sight, a telescopic sight 330 aiming sight, an aperture sight 340 aiming sight, and a reflex sight 350 aiming sight. The operation of the open sight 310 aiming sight was described above with respect to FIG. 1A. The tube sight 320 aiming sight is a thin-wall tube having a cap threaded rear end for accepting standard rear aperture sighting disk. The tube sight 320 can be built into the housing of the barcode reader 110 and thereby enable the reader 110 to read the target barcode 140. The telescopic sight 330 has a tube like structure with an objective lens on one side of the tube and an eyepiece lens on the other side other side. The objective lens is used for collecting light from the target object 130 and bringing it to a point of focus within the tube and the eyepiece lens is used to spread out the light in the focus point and thereby present a magnified or a larger image of the target object 130 to the operator. This aids the operator in accurately directing the barcode reader 110 towards the target object 130 and read the target barcode 140. The telescopic sight 330 can be removably attached to the barcode reader 110.

The aperture sight 340 includes a disk shaped rear sight with a small hole or aperture in the center. The theory of operation behind the aperture sight is that the human eye will automatically center the target object 130 when looked through the aperture in the rear sight. In other words, the operator can precisely view the target object 130 through the aperture and direct the barcode reader 110 towards the target object 130 to read the target barcode 140. The reflex sight 350 uses refractive or reflective optical collimators to generate a collimated image of a luminous or reflective reticle. This collimated image is reflected off a dichroic mirror or beam splitter to allow the operator to see the field of view (FV) and a reflection of the projected reticle simultaneously, thereby enabling the operator to view the target object 130.

Figure 4:
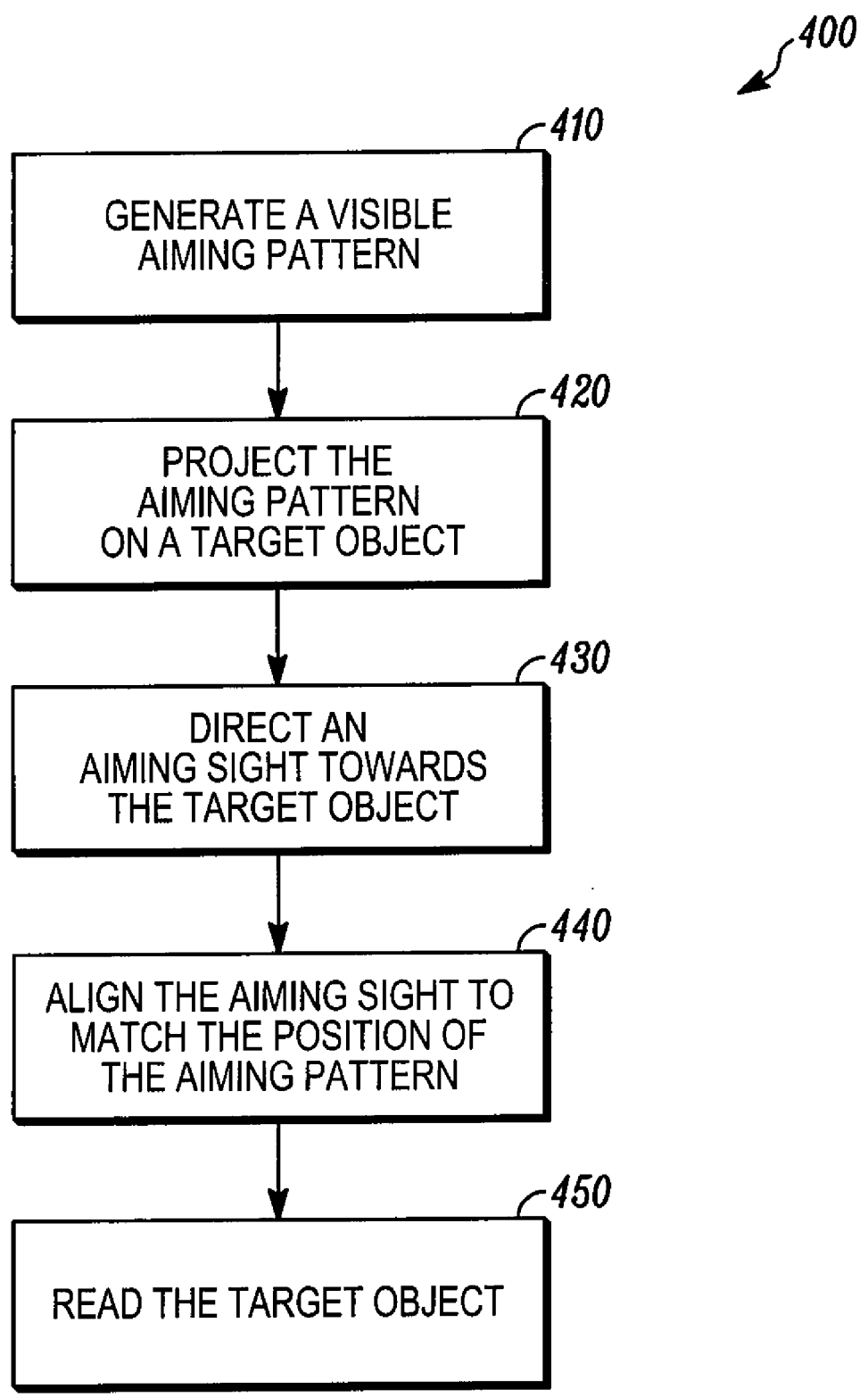
FIG. 4 is a flowchart of a method for aiming a target object in accordance with some embodiments.

FIG. 4 is a flowchart of a method for aiming a target object in accordance with some embodiments. The method 400 describes accurately aiming a target object 130 and reading a barcode 140 on the target object using an aiming sight 120 and an aiming system 70. The method 400 includes generating 410 a visible aiming pattern by the aiming system 70 in the barcode reader 110. The visible aiming pattern includes such as, but not limited to, a single dot of illumination, a plurality of dots and lines of illumination, and overlapping groups of dots or lines of illumination. The method 400 further includes projecting 420 the generated aiming pattern on the target object 130, wherein the target object includes the desired barcode 140. Upon projecting 420 the aiming pattern on the target object 130, an operator of the barcode reader 110 can direct 430 the aiming sight 120 towards the target object 130. The operator aims or focuses the target object 130 through the aiming sight 120, such that the desired barcode 140 is clearly visible. Further, the operator aligns 440 the aiming sight 120 to focus on the projected aiming pattern and thereby enable the barcode reader 110 to read 450 the target object.

In one embodiment, the generation 410 and projection 420 of the aiming pattern can be disabled and the operator can only use the aiming sight 120 to aim the target object 130. The barcode reader 110 can therefore read or scan the desired barcode 140 without using the aiming system 70. In one example, the aiming system 70 can be completely disabled and the operator uses only the aiming sight 120 for aiming the target barcode 140. In another example, for smaller distances where the aiming pattern is clearly visible, the aiming system can be used for aiming the barcode 140, however, for large distances the aiming system can be disabled and the aiming sight 120 can be used for aiming the barcode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus comprising:
a barcode reader for reading a barcode on a target object; an illumination system for generating an illumination pattern directed towards the target object for reading the barcode; an aiming sight coupled to the barcode reader; and an aiming system, separate from the illumination system, and within the barcode reader projecting a visible aiming pattern on the target object, wherein the aiming sight enables an operator of the barcode reader to view the visible aiming pattern projected on the target object by the operator looking through the aiming sight and thereby align the barcode reader with the target object and read the barcode on the target object, and wherein the aiming sight comprises a telescopic lens sight secured to the top of the barcode reader.

2. The apparatus of claim 1, wherein the aiming system comprises a laser diode, a focusing lens, and a pattern generator for generating a desired aiming pattern.

3. The apparatus of claim 1, wherein the visible aiming pattern comprises at least one of single dot of illumination, a plurality of dots and lines of illumination, and overlapping groups of dots or lines of illumination.

4. The apparatus of claim 1, wherein the aiming sight is aligned to match the position of the visible aiming pattern generated by the aiming system.

5. The apparatus of claim 4, wherein the aiming sight is fixedly aligned with respect to the aiming system.

6. The apparatus of claim 4, wherein the aiming sight is adjustable with respect to the aiming system.

7. The apparatus of claim 1, wherein the aiming sight includes at least one of an open sight aiming sight, an aperture sight aiming sight, a telescopic sight aiming sight, a reflex sight aiming sight, and a tube sight aiming sight.

8. The apparatus of claim 1, wherein the aiming sight includes an optical filter attached to the aiming sight.

9. The apparatus of claim 1, wherein the aiming sight is built into a housing of the barcode reader.

10. The apparatus of claim 1, wherein the aiming sight is removable with respect to the barcode reader.

11. The apparatus of claim 1, wherein the aiming sight is foldable with respect to the barcode reader.

12. The apparatus of claim 1, wherein the aiming sight is molded on the barcode reader.

13. The apparatus of claim 1, wherein the barcode reader includes at least one of a laser based barcode reader and an imaging based barcode reader.

14. A system comprising:
a scanning arrangement comprising a barcode reader for reading a barcode on a target object; an illumination system for generating an illumination pattern directed towards the target object for reading the barcode; an aiming sight; and an aiming system, separate from the illumination system, within the barcode reader projecting a visible aiming pattern on the target object, wherein the aiming sight enables an operator of the barcode reader to view the visible aiming pattern on the target by the operator looking through the aiming sight and thereby align the scanning arrangement with the target object and read the barcode on the target object, and wherein the aiming sight comprises a telescopic lens sight secured to the top of the barcode reader.

15. The system of claim 4, wherein the aiming sight is aligned to match the position of the aiming pattern generated by the aiming system.

16. A method comprising:
operating a barcode reader to read a barcode on a target object; generating an illumination pattern towards the target object for reading the barcode through an illumination system; generating a visible aiming pattern by an aiming system, separate from the illumination system, in the barcode reader; projecting the visible aiming pattern on the target object; and viewing the visible aiming pattern on the target object by the operator looking through an aiming sight coupled to the barcode reader, wherein the viewing enables an operator of the barcode reader to align the barcode reader with the target object, reading the barcode on the target object with the barcode reader, and wherein the aiming sight comprises a telescopic lens sight secured to the top of the barcode reader.

17. The method of claim 16 further comprising aligning the aiming sight to match the position of the aiming pattern.

* * * * *

UNITED STATES PATENT AND TRADEMARK OFFICE
CERTIFICATE OF CORRECTION

| | | |
|---|---|---|
| PATENT NO. | : 8,061,616 B2 | Page 1 of 1 |
| APPLICATION NO. | : 12/641382 | |
| DATED | : November 22, 2011 | |
| INVENTOR(S) | : Goren et al. | |

It is certified that error appears in the above-identified patent and that said Letters Patent is hereby corrected as shown below:

In Column 10, Line 44, in Claim 15, delete "claim 4," and insert -- claim 14, --, therefor.

Signed and Sealed this
Twenty-fifth Day of December, 2012

David J. Kappos
*Director of the United States Patent and Trademark Office*